4 Sheets—Sheet 1.

J. MONTO.

Assignor to A. L. HOLLANDER, C. H. BRADSHAW & J. S. FOLSOM.

MACHINERY FOR TINNING OR RETINNING PANS.

No. 11,111. Reissued Sept. 23, 1890.

Witnesses.
A. D. Harrison.
P. Emerson

Inventor.
Joseph Monto
by Wright Brown & Quinby
Attys.

J. MONTO.

Assignor to A. L. HOLLANDER, C. H. BRADSHAW & J. S. FOLSOM.

MACHINERY FOR TINNING OR RETINNING PANS.

No. 11,111. Reissued Sept. 23, 1890.

THE ECKERT LITHOGRAPHING CO., WASHINGTON, D. C.

J MONTO.
Assignor to A. L. HOLLANDER, C. H. BRADSHAW & J. S. FOLSOM.
MACHINERY FOR TINNING OR RETINNING PANS.
No. 11,111. Reissued Sept. 23, 1890.
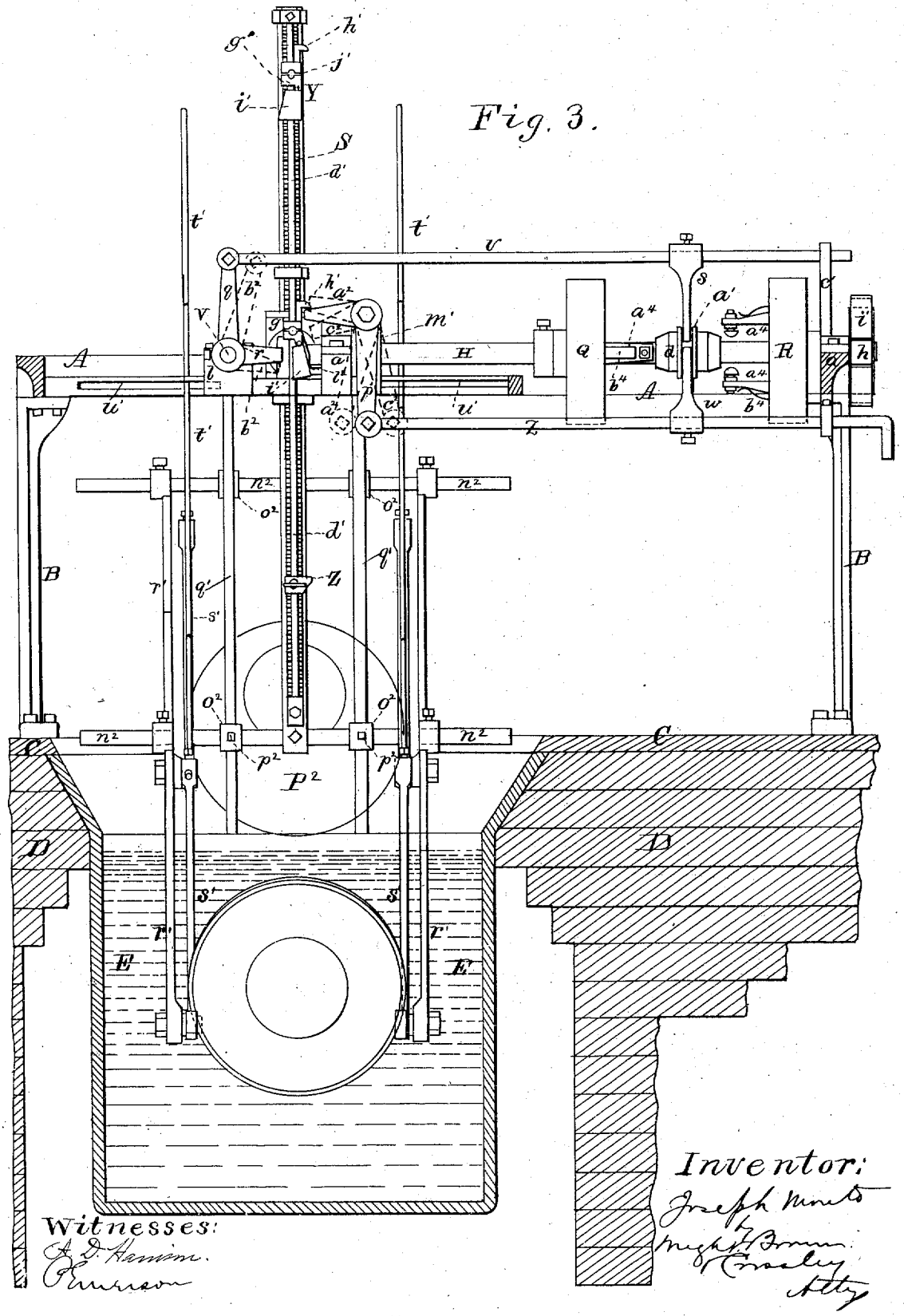

J. MONTO.
Assignor to A. L. HOLLANDER, C. H. BRADSHAW & J. S. FOLSOM.
MACHINERY FOR TINNING OR RETINNING PANS.
No. 11,111. Reissued Sept. 23, 1890.
Fig. 8.
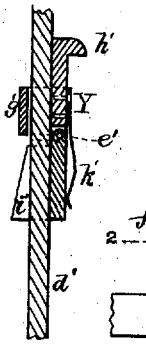
Fig. 6.
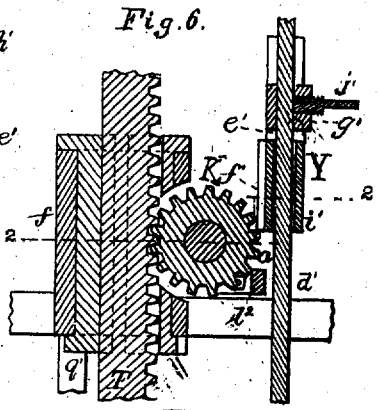
Fig. 9.
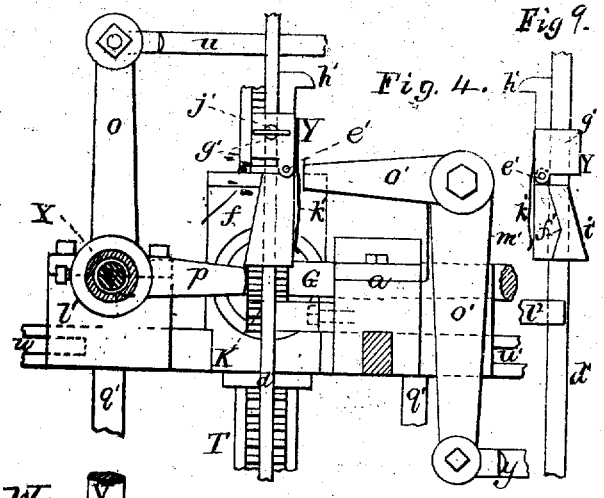
Fig. 4.
Fig. 7.
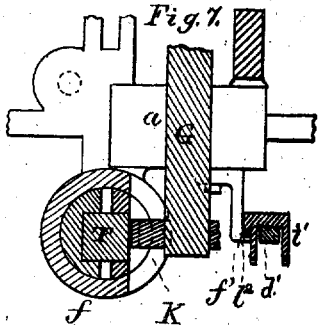
Fig. 5.
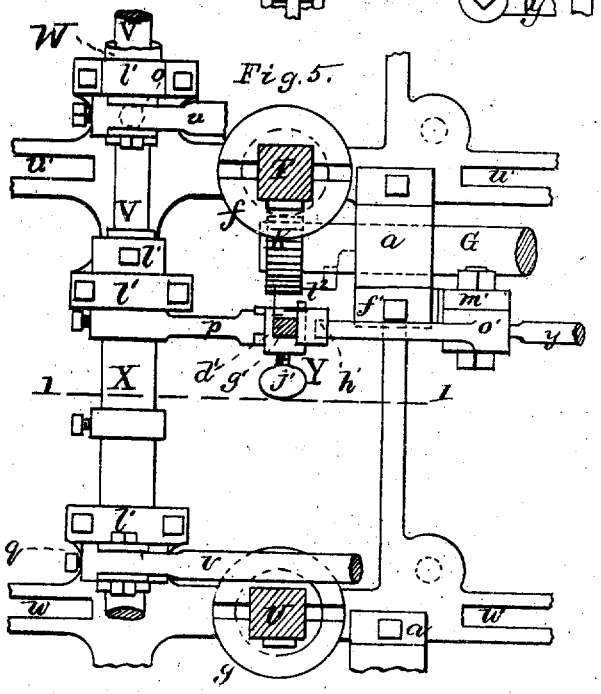
Fig. 10.
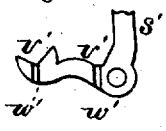
Fig. 11.
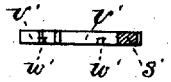
Fig. 12.
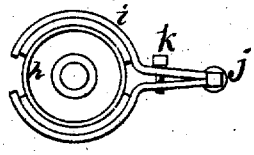
Fig. 13.
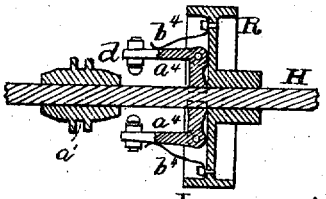
Witnesses.
A. D. Harrison.
Emerson
Inventor.
Joseph Monto
by Wright Brown & Crosby
Attys.

UNITED STATES PATENT OFFICE.

JOSEPH MONTO, OF CHELSEA, ASSIGNOR TO ALVA L. HOLLANDER AND CHARLES H. BRADSHAW, OF SOMERVILLE, AND JOHN S. FOLSOM, OF MILLIS, MASSACHUSETTS.

MACHINERY FOR TINNING OR RETINNING PANS.

SPECIFICATION forming part of Reissued Letters Patent No. 11,111, dated September 23, 1890.

Original No. 372,555, dated November 1, 1887. Application for reissue filed March 2, 1889. Serial No. 301,813.

*To all whom it may concern:*

Be it known that I, JOSEPH MONTO, of Chelsea, in the county of Suffolk, of the Commonwealth of Massachusetts, have invented a new and useful Improvement in Machinery for Tinning or Retinning Pans; and I do hereby declare the same to be described in the following specification and represented in the accompanying drawings, in which—

Figure 1:
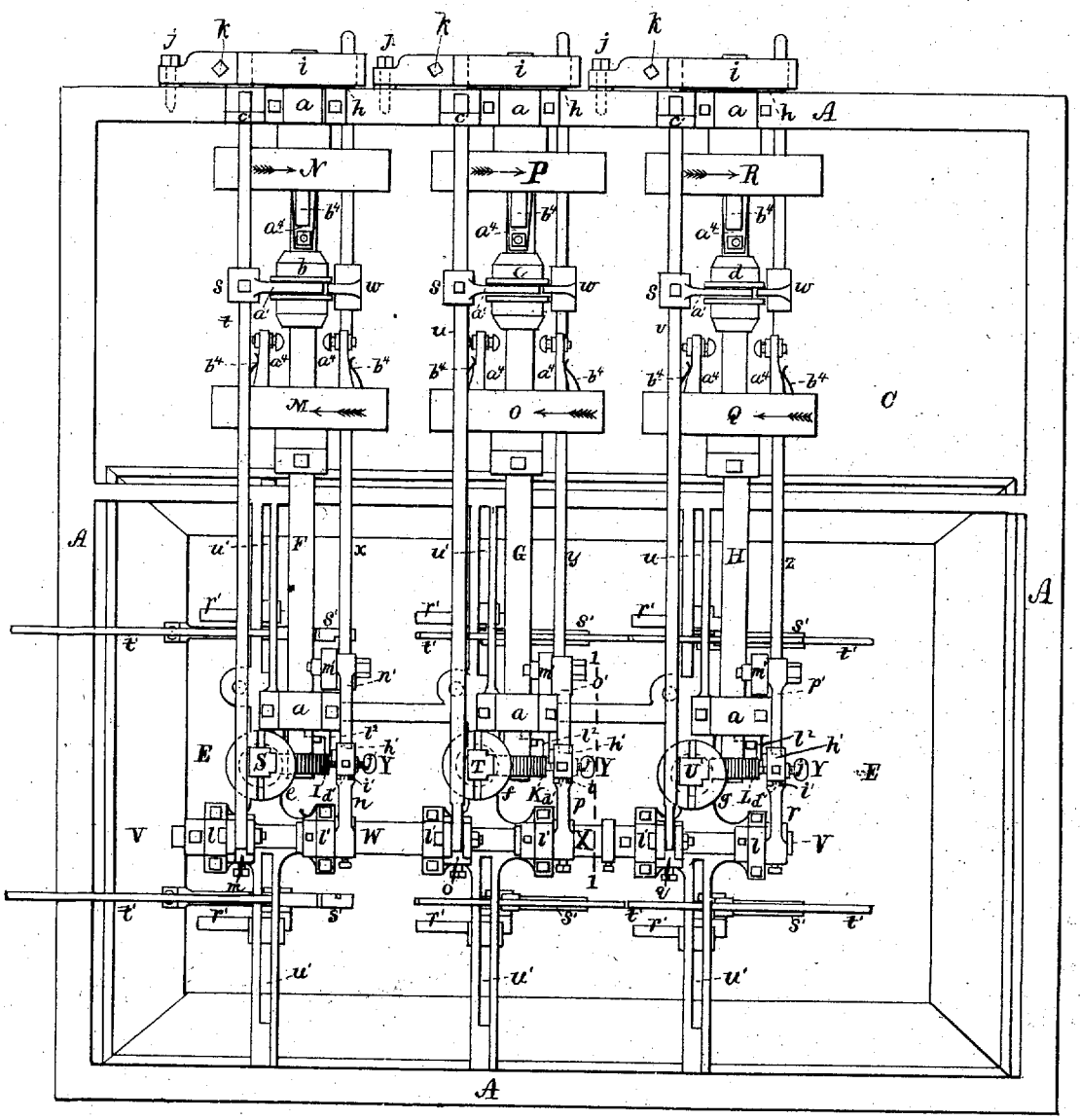
Figure 2:
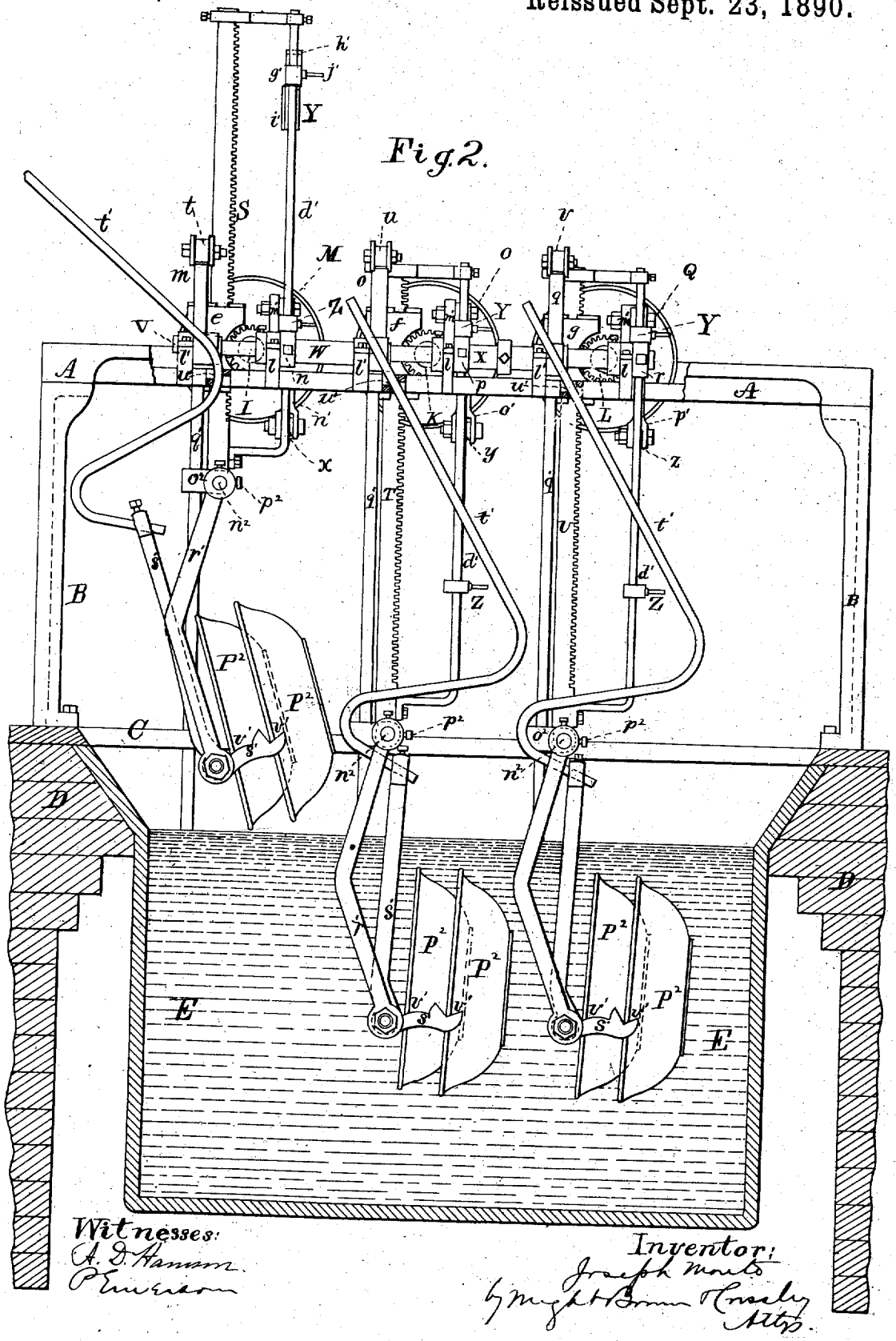

Figure 1 is a top view, Fig. 2 a side elevation, and Fig. 3 an end view, of a machine embodying my invention, the nature of which is defined in the claims hereinafter presented. In Figs. 2 and 3 the grease pot or reservoir and a portion of the furnace for heating it are shown in section, portions of the frame-work being represented as broken away, in order to exhibit to advantage sundry parts of the mechanism to be described. Fig. 4 is a longitudinal and vertical section taken through line 1 1 of Fig. 1, in order to exhibit the rack T and the adjacent mechanism that operates therewith. Fig. 5 is a top view of the parts represented in Fig. 4, together with the rack U and some of the mechanism adjacent thereto. Fig. 6 is a transverse and vertical section of a portion of the rack T and its bearing or guide *f*, with the dog-sustaining rod *d'*, that moves with the said rack, such figure showing the pinion K and the tripper $l^2$, hereinafter mentioned. Fig. 7 is a horizontal section of the mechanism shown in Fig. 6, it being taken on line 2 2 thereof. Fig. 8 is a vertical section, and Fig. 9 a side view, of the rod *d'* and its dog Y, such Figs. 4, 5, 6, 7, 8, and 9 being represented on an enlarged scale. Fig. 10 is an inner side view, and Fig. 11 a top view, of the basin-sustaining arm of the lever *s'*, hereinafter referred to. Fig. 12 is a side view of the brake mechanism applied to the frame A and one end of each of the shafts F, G, and H. Fig. 13 is a vertical section of the pulley R, shaft H, and the springs and friction-levers or mechanism for engaging the pulley with and disengaging it from the shaft.

The mechanism to which my invention relates is for the purpose of retinning pans made of tinned sheet metal and struck into form by dies, the object being to insure to them a fine finish by means of a light coating of tin. In the process of retinning such pans great care is necessary in withdrawing them from the hot grease, in order to produce the desired or even distribution of the metal upon them. According to the usual practice prior to my invention, a pan, after having been immersed in a bath of molten tin, has been plunged into a bath of grease or tallow heated to about 500° Fahrenheit, the quantity of tin to remain on the article being gaged by the period of immersion and the finish being determined by the speed of withdrawal of the pan from the hot grease. The bath of hot grease keeps the tin melted on the pans and removes the surplus. The withdrawing of the pan from the bath of grease has to be very gradually and steadily accomplished, and when done by manual labor is not only very tiresome to the operative, but frequently fails in effecting an even layer of the metal on the pan.

For the purpose of retinning pans it is customary to use a series of four pots arranged in a row and provided with a furnace or or means of heating each, the first and third pots being for holding the grease, while in the second or intermediate and in the fourth pot is the tin. The last or fourth pot is smaller than either of the others, it being what is termed the "list-pot," which is charged with the metal, and is to remove from the pan the "list" or drip or small surplus metal that may adhere to and protrude from the lower edge of the pan.

The pan is first introduced into the bath of grease of the first pot for about one-half a minute, after which the pan is immersed in the molten tin in the next pot, and after withdrawal therefrom the pan is submerged in the third pot or bath of grease, which will remove the surplus of the coating of tin, the amount removed being determined by the length of time of the immersion, the finish being due to the speed with which the pan is removed from the grease bath. Finally, the lower part of the pan is dipped into the last pot, in order that the hot charge thereof may remove the drip or surplus of tin that may adhere to the lower edge of the pan. Next, the pan has the grease on it removed from it by sawdust and flour or other suitable means.

The machinery to be described is for introducing the pans or basins into and the removal of them from the second of the grease-pots.

In the drawings the frame of the machine is shown at A as resting upon standards B, erected on the base-plate C, which is sustained by the brick-work D of a furnace, in which is set the grease pot or reservoir E, as represented. Supported in boxes or bearings *a* of the frame A are three shafts F G H, (see Fig. 1,) arranged parallel to each other and having pinions I K L on the ends, which are directly over the reservoir E. The said shafts are also each provided with two friction-pulleys, as shown at M N, O P, and Q R, respectively, which, loose on the shafts, are revolved (in the direction indicated by arrows in Fig. 1) by belts from a suitable motor. Each of the said pulleys is provided with a friction mechanism for engaging it with the shaft, and there is applied to the shaft between each pair of pulleys a slide *b*, *c*, or *d*, as shown in Fig. 1, to operate said friction mechanism when it is desired to clutch either of the pulleys to its shaft. Any suitable friction mechanism may be used. In this case each pulley has two right-angular levers $a^4$ fastened to it and extending from it, as shown in Fig. 3, the inner arms of such levers being to grasp the shaft and operate like brakes thereon. To the pulley there is affixed a spring $b^4$ to force the lever out of contact with the shaft, all being as shown in Fig. 13. Each of the shafts F G H is provided on its outer end with a wheel *h*, whose periphery is nearly encompassed by a friction-brake *i*. (See Figs. 1 and 12, the latter figure being a side view of the wheel and its brake.) The said brake is secured to the frame A by a bolt *j* and provided with a screw *k* to contract it, in order to regulate the tension of the brake on the wheel.

The office of the mechanism above described is to insure the stoppage of either of the shafts the moment it is released from the clutch of either of its pulleys.

The pinions I K L, hereinbefore mentioned, engage with racks S T U, arranged to move vertically in bearings or guides *e f g*, erected on the frame A, one of such bearings, with its rack and pinion and adjacent parts, being shown in vertical section in Fig. 6 and in horizontal section in Fig. 7 on an enlarged scale. There is secured to each of the racks S T U, at or near its ends and in parallelism therewith, a rod *d'*, (see Fig. 2,) to which are clamped by thumb-screws two dogs or slides Y Z. The dog Y is shown on an enlarged scale in the relation it bears to the adjacent parts in side view in Fig. 4, in top view in Fig. 5, in vertical section in Fig. 6, in horizontal section in Fig. 7, and in vertical section in Fig. 8, the latter section being taken in a plane at right angles to that shown at Fig. 6. It is also shown in side view in Fig. 9, the latter figure exhibiting the side opposite to that represented in Fig. 4. The said dog Y is made in two parts *g'* and *i'*, pivoted together at *e'*, the upper part *g'* being tubular for a portion of its length to receive and encompass the rod *d'*, which throughout its length is made square or prismatic in transverse section. Projecting from the upper end of the part *g'* is a catch or ear *h'*. The lower part *i'* of the dog is a catch made to embrace the rod *d'* on three of its sides, but is open on the fourth side, (see Fig. 7,) so as to allow it to turn on its pivot when the inclined edge of the projection *f'* on one side of said catch *i'* (see Fig. 9) is carried into contact with and moved along against a projection or tripper $l^2$, fixed to one of the bearings *a*. A spring *k'*, (see Fig. 9,) secured to the part *g'*, bears against the part *i'* and returns it to position when it is out of contact with the tripper $l^2$. The clamp-screw of the dog is shown at *j'* in Figs. 4 and 6. Another shaft V, (see Figs. 1 and 3,) supported near its ends in bearings *l* on the frame A and with its axis in the same horizontal plane, but at right angles to the axes of the shafts F G H, has secured to it near its ends by set-screws two arms *m r*. The said shaft V is encompassed between the outer bearings *l* by two sleeves or tubular shafts W X, said tubular shafts being adapted to turn independently of the shaft V and in the four intermediate bearings *l'*. The shaft W has two arms *n o* and the shaft X two arms *p q*, which are secured to the shafts by set-screws. The arms *m o q* are arranged in vertical and the arms *n p r* in horizontal positions or in planes at right angles to each other. (See Figs. 1 and 3.) The arms *m o q* are connected to forks *s* by rods *t u v*. Said rods are pivoted at one end to the said arms and at the other end have bearings in standards *c'*, erected on the frame A. The arms *n p r* project into the path of movement of the catches *i'* of the dogs Y, and when either of said arms is moved or turned on its axis by said catch *i'* one of the arms *m o q* will be caused to move one of the slides *b*, *c*, or *d* into contact with the friction mechanism of one of the pulleys N P R. Pivoted to the standards *m'*, projecting upward from the frame A, are three bell-cranks *n' o' p'*, (see Figs. 3, 4, and 5,) the lower arms of which are connected to forks *w* by rods *x y z*. (See Figs. 1 and 3.) Said rods are pivoted to the bell-cranks and are supported in bearings in the frame A. The upper arms of said bell-cranks project into the path of movement of the catch *h'* of the dogs Y and also into the path of movement of the dogs Z. Each of the forks *s* and *w* (which are clamped the former to the rods *t u v* and the latter to the rods *x y z*, see Fig. 1) extends into an annular groove *a'* in one of the slides *b c d*. Said slides have tapering ends, and when they are forced between the levers $a^4$, projecting from the pulleys M N, O P, and Q R, as shown in Figs. 1 and 3, such slides serve to clutch said pulleys to their shafts.

Each rack S T U has a rod $n^2$ secured to it near its lower end and so as to project from it equally in opposite directions, as shown in Fig. 3. To each rod $n^2$ are two guides $o^2$ $o^2$. (See Fig. 2.) The said guides receive and encompass guide-rods $q'$, which depend from the frame A (see Figs. 2 and 3) and together are to support the racks in their vertical movements. There are also secured to each rod $n^2$ by set-screws two arms $r'$ $r'$, (see Fig. 3,) to the lower end of each of which is pivoted a basin or pan sustaining lever $s'$. The longer arm of each of said levers $s'$ is provided with a tilting rod $t'$, formed as shown in Fig. 2. The said rods $t'$ work in slots $u'$ in the frame A, and operate with them to turn the levers $s'$ on their fulcra. The levers $s'$ are constructed with two V-shaped notches $v'$ $v'$, which serve as guides to the basin edge or rim-supporting grooves $w'$ $w'$, formed in the lower arms of said levers. (See Figs. 10 and 11, the former being an inner side view and the latter a top view of the shorter arm of one of the levers $s'$.)

By means of the rod $n^2$ and the arms $r'$ $r'$ applied thereto, as described, the two levers $s'$ for supporting the pans can be moved apart from or nearer to each other, as the diameter of the pans may require, in order for them to be sustained by the levers. Furthermore, by having to the levers the tilting rods $t'$, working in slots $u'$, the levers in rising out of the grease-pot will be tipped, so as to incline the pans in a manner to prevent the metal from becoming unevenly laid upon them or settling to an improper extent on the lower sections of them.

In the operation of the machine there is always one pair of the pans out of the grease-reservoir, while the remaining two pairs are in it. While either pair is descending in the grease and just before it reaches its lower position the mechanism for moving another pair is put in action, so as to raise such pair with the requisite velocity out of the grease and gradually turn the pair from a vertical into an inclined position. Thus on the first pair having nearly reached its lower position in the reservoir the second pair will be put in movement upward. After removal of the second pair of pans and substitution of others for them they are made to descend into the reservoir, and just previous to their attaining their lower position therein the third pair of pans commences to rise. Having attained its higher position and been removed from its sustaining mechanism and a fresh pair substituted and put in motion downward the first pair of pans is set in motion upward just before the third pair reaches its lower position.

I will now proceed to explain more particularly the operation of the mechanism hereinbefore described to effect results, as stated.

In Fig. 2 of the drawings the rack S and the parts connected therewith are represented as in their higher positions. The pans or basins $P^2$, I will suppose to have just emerged from the hot tallow and to be supported on the two levers $s'$ and to be in a finished state, except in having the list removed from them. The racks T and U, with their mechanism, are represented in their lower position, the basins or pans $P^2$, sustained by their levers $s'$, being shown as they are situated when submerged in the hot tallow, with which the reservoir in practice is supplied. I will now remove the finished basins or pans and replace them by two others just taken from the tin bath and push the rod $x$ (see Fig. 1) in the direction to cause fork $w$ to move the slide $b$ between the brake-levers $a^4$ $a^4$ of the pulley M, which will start to revolve the shaft F and its pinion I in the direction denoted by the arrow on said pulley M, and consequently the rack S will begin its descent. While the rod $x$ is moved, as above mentioned, the bell-crank $n'$, to which it is pivoted, (which is of the same form in side view as the bell-crank $p'$, shown in Fig. 3,) will be turned on its pivot into the position shown in dotted lines at $a^2$ in Fig. 3. The rack S is now descending, and as it continues its movement the catch $i'$ of the dog Y strikes the arm $n$ of the tubular shaft W (see Fig. 1) and turns said shaft W in its bearings, and thereby moves its arm $o$ sufficiently (or into the position shown in dotted lines at $b^2$ in Fig. 3) to carry the slide $c$ (by means of the fork $s$ and rod $u$, which is pivoted to said arm $o$,) into contact with the friction mechanism of the pulley P and clutches it to the shaft G, and thereby causes it and its pinion K to revolve in the direction indicated by the arrow on said pulley P. The rack T will now commence its ascent. As soon as the pulley P was clutched to its shaft, as above described, the catch $i'$ was relieved from the arm $n$ by the incline $f'$ on its side (see Fig. 9) coming in contact with the projection $l^2$, (see Figs. 1, 5, 6, 7, and 9,) whereby the catch $i'$ was moved away and allowed to pass by the end of the arm $n$. The rack S continues its descent until the catch $h'$ of the dog Y strikes the upper arm of the bell-crank $n'$, which is now in the position shown in dotted lines at $a^2$ in Fig. 3, and turns it into the position of the bell-crank shown in full lines in said Fig. 3. The last-described movement of the bell-crank $n'$ also carried the slide $b$ (by means of the rod $x$ and fork $w$) out of contact with the friction mechanism of the pulley M, thereby unclutching it from the shaft F, and consequently arresting the descent of the rack S. When the slide $c$ was moved into contact with the friction mechanism of the pulley P, as hereinbefore described, the fork $w$ and the rod $y$, to which it is clamped, were also moved so as to turn the bell-crank $o'$ on its pivot into the position shown in dotted lines at $c^2$ in Fig. 3. The rack T is now ascending, and as its dog Z strikes the upper arm of the bell-crank $o'$ (which is in the position shown in dotted lines at $c^2$ in Fig. 3, as above mentioned) it (the bell-crank $o'$) will be turned into the position of the bell-crank shown in full lines in Fig. 3, and the slide $c$, by means of the rod $y$ and fork $w$, will be withdrawn from the friction mechanism of the pulley P, and consequently the shaft G, pinion K, and rack T will be arrested in their movements. The finished basins on the supporting-levers of the rack T will next be replaced by unfinished ones, and the rod $y$, moved so as to carry the slide $c$ into contact with the clutch mechanism of the pulley O, and the shaft G and its pinion K will commence to revolve in the direction of the arrow on the pulley O, and consequently the rack T will descend. When the rod $y$ was moved, as just indicated, the bell-crank $o'$ was turned on its pivot into the position shown in dotted lines at $a^2$ in Fig. 3, and when the catch $i'$, which is now in movement downward with the rack T, strikes and turns the arm $p$ on its axis the arm $q$ will also move the rod $v$ and fork $s$, and consequently cause the slide $d$ to clutch the pulley R to the shaft H, and thus to start the rack U in its upward movement. During the movement of the slide $d$ into contact with the friction mechanism of the pulley R the fork $w$ and its rod $z$ were carried with it and the bell-crank $p'$ turned on its axis into the position shown in dotted lines at $c^2$, Fig. 3. As the catch $h'$ in movement with the rack T strikes the upper arm of the bell-crank $o'$ and turns it on its fulcrum from the position shown in dotted lines at $a^2$ to that shown in full lines in Fig. 3, the rack T will cease its descent. The rack U is now ascending, and as the dog Z in movement therewith strikes the under side of the upper arm of the bell-crank $p'$ and turns it from the position shown in dotted lines at $c^2$ in Fig. 3 into that shown in full lines in said figure the rack U will complete its upward movement. The basins on the supporting-levers $s'$ of the rack U are now to be removed and others substituted, and the slide $d$, by means of its rod $z$ and fork $w$, is to be moved so as to clutch the pulley Q with its shaft H, and thereby set it and its pinion L in revolution in the direction indicated by the arrow on said pulley Q. The rack U will now descend, and as the catch $i'$ in movement therewith strikes and turns the arm $r$, which will turn the shaft V on its axis in its bearings $l$ in the frame and in the tubular shafts W and X, the arm $m$ on the farther end of the said shaft V will also move the slide $b$ by means of the fork $s$ and rod $t$ and clutch the pulley N to its shaft F and start it and its pinion to revolve in the direction of the arrow on said pulley N, in consequence of which the rack S will now commence its ascent. When the catch $h'$, now descending with the rack U, strikes the upper arm of the bell-crank $p'$ and turns it on its pivot from the position shown at $a^2$ in dotted lines to the position shown in full lines in Fig. 3, the slide $d$ will be moved by the fork $w$ and rod $z$ so as to unclutch the pulley Q from its shaft H and the stoppage of the rack U in its descent will result. The rack S and its accompanying mechanism are now ascending and will cease their upward movement when the dog Z strikes the under side of the upper arm of the bell-crank $n'$ and turns it from the position shown at $c^2$ in dotted lines to that shown in full lines in Fig. 3. We have now reached the point from which we started.

From the above it will be seen that each of the racks S, T, and U is provided with mechanism for supporting a pair of the pans or basins, and besides it not only has mechanism for depressing them into and raising them out of the grease pot or reservoir E in the order hereinbefore explained, but there is combined with it a mechanism for tipping the pans from a vertical or about a vertical position they have when in the grease bath into an inclined position during their rise out of it, such tipping of them being to prevent the tin from unevenly spreading on them.

I claim—

1. The combination, with a grease-reservoir, of a set of racks, holders for tinned articles connected to said racks, and of mechanism serving automatically to introduce such articles into the reservoir and to remove therefrom successively one or a pair of said articles while the others remain in the grease, and whereby the action of the hot bath on the articles may be definitely regulated, as set forth.

2. The combination, with a grease-pot, of a set of vertically-movable racks, a set of swinging holders pivoted to said racks, mechanism adapted automatically to immerse articles in the grease and to remove them successively therefrom in the order specified, and a set of rods connected to said holders, substantially as described, serving to tilt or tip the articles during their rising motion, as set forth.

3. The combination, with a grease-pot, of a rack mounted above such reservoir, a holder adapted to carry one or more tinned articles pivoted thereto, and a swinging lever attached to said holder, mechanism adapted to move such rack so as to first introduce the articles into the grease, next to withdraw them therefrom, and then to arrest or hold it stationary when fully withdrawn, and a push-rod serving to put in operation the said automatic mechanism after such arrest, substantially as described.

4. The combination, with a grease-pot, of a set of racks, holders adapted severally for carrying one or more pans connected thereto, rods connected to such holders, and mechanism adapted to operate said racks, holders, and rods so as successively to immerse, lift, and tilt the pans and then arrest the mechanism.

5. The combination, with the grease pot or reservoir E, of mechanism, substantially as described, for introducing therein and removing therefrom in the order as specified tinned pans or basins, such mechanism consisting of the series of racks S, T, and U, having mechanism for guiding them in their vertical movements, and provided not only with means for supporting the pans or basins, but with mechanism for moving them (the said racks) upward and downward and intermittingly relatively to the said grease pot or reservoir, all being essentially as described, such mechanism for supporting the pans being the notched and grooved arms of the levers $s'$, connected with the racks, and such mechanism for so operating the said racks being the pinions I K L, shafts F G H, pulleys M N O P Q R, the clutch slides $b$ $c$ $d$, clutching-levers $a^4$, forks $s$ $w$, rods $t$ $u$ $v$ $x$ $y$ $z$, arms $m$, $n$, $o$, $p$, $q$, and $r$, bell-cranks $n'$ $o'$ $p'$, shafts V W X, rods $d'$, dogs Y Z, wheels $h$, and friction-brakes $i$, all being arranged and applied as set forth.

6. The combination, with the grease pot or reservoir E, of mechanism, substantially as described, for supporting and introducing therein and removing therefrom in the order specified tinned pans or basins, and while they are being raised tipping them into inclined positions, essentially as and for the purpose set forth, such mechanism for so actuating the pans consisting of the series of racks S T U, having mechanism for guiding them in their vertical movements, and provided not only with means for supporting the pans or basins, but with mechanism for moving them (the said racks) upward and downward and intermittingly relatively to the said grease pot or reservoir, all being essentially as described, such mechanism for supporting the pans being the notched and grooved levers $s'$, connected with the racks, and such mechanism for so operating the said racks being the pinions I K L, shafts F G H, pulleys M N O P Q R, the clutch-slides $b$ $c$ $d$, clutching-levers $a^4$, forks $s$ $w$, rods $t$ $u$ $v$ $x$ $y$ $z$, arms $m$, $n$, $o$, $p$, $q$, and $r$, bell-cranks $n'$ $o'$ $p'$, shafts V W X, rods $d'$, dogs Y Z, wheels $h$, and friction-brakes $i$, and such mechanism for supporting and tipping the pans being the said levers $s'$, the arms $r'$, and the bent rods $t'$, the slots $u'$, and rods $n^2$, the latter being attached to the said racks, and all being to operate essentially as described.

7. The combination, with each rack S, T, and U, and the two levers $s'$ thereof for supporting the pans, of the rod $n^2$ and the two adjustable arms $r'$, applied to such rod and levers, substantially as set forth.

8. The combination, with the grease pot or reservoir E, of mechanism, substantially as described, for supporting and introducing therein and removing therefrom, as specified, one or more tinned pans or basins, and while such is or are being raised tipping it or them into an inclined position or positions, essentially and for the purpose as set forth, such mechanism for so actuating the pan or pans consisting of a rack having mechanism for guiding it in its vertical movements, and provided not only with means for supporting the pan, pans, or basins, but with mechanism for moving it (the said rack) upward and downward and intermittingly relatively to said grease pot or reservoir, all being essentially as described, such mechanism for supporting the pan or pans being the pair of notched and grooved levers $s'$, connected with the rack, and such mechanism for so operating the said rack being the pinion I, shaft F, pulleys M N, clutch-slide $b$, clutching-levers $a^4$, fork $w$, rod $x$, bell-crank $n'$, rod $d'$, catch $h'$, dog Z, wheel $h$, and friction-brake $i$, and such mechanism for supporting and tipping the pan or pans being the said levers $s'$, the arms $r'$, and the bent rod $t'$, the slots $u'$ and rods $n^2$, the latter being attached to the said rack, and all being to operate essentially as described.

JOSEPH MONTO.

Witnesses:
C. F. BROWN,
W. C. RAMSAY.